US012449905B2

United States Patent
Zhang

(10) Patent No.: US 12,449,905 B2
(45) Date of Patent: Oct. 21, 2025

(54) DISPLAY SYSTEMS, OPERATION FEEDBACK METHODS, ELECTRONIC DEVICES AND STORAGE MEDIA

(71) Applicants: Beijing BOE Technology Development Co., Ltd., Beijing (CN); BOE Technology Group Co., Ltd., Beijing (CN)

(72) Inventor: Hengfei Zhang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/569,004

(22) PCT Filed: Jul. 1, 2022

(86) PCT No.: PCT/CN2022/103394
§ 371 (c)(1),
(2) Date: Dec. 11, 2023

(87) PCT Pub. No.: WO2023/000958
PCT Pub. Date: Jan. 26, 2023

(65) Prior Publication Data
US 2024/0281068 A1 Aug. 22, 2024

(30) Foreign Application Priority Data

Jul. 21, 2021 (CN) .......................... 202110825871.7

(51) Int. Cl.
G06F 3/01 (2006.01)
G06F 3/04847 (2022.01)
G06F 3/0488 (2022.01)

(52) U.S. Cl.
CPC .......... *G06F 3/016* (2013.01); *G06F 3/04847* (2013.01); *G06F 3/0488* (2013.01)

(58) Field of Classification Search
CPC ..... G06F 3/016; G06F 3/04847; G06F 3/0488
See application file for complete search history.

(56) References Cited

U.S. PATENT DOCUMENTS 10,296,128 B1 * 5/2019 Nold ................... G06F 3/04883
2008/0158149 A1 7/2008 Levin
(Continued)

FOREIGN PATENT DOCUMENTS

CN 101910978 A 12/2010
CN 102479047 A 5/2012
(Continued)

OTHER PUBLICATIONS

PCT/CN2022/103394 international search report.
PCT/CN2022/103394 Written Opinion.
EP22845123.3 extended European search report dated Sep. 5, 2024.

Primary Examiner — Kenneth B Lee, Jr.
(74) Attorney, Agent, or Firm — IPro, PLLC

(57) ABSTRACT

The present disclosure relates to a display system, an operation feedback method, an electronic device and a storage medium. In an embodiment of the present disclosure, the display system includes a processor, and a display screen configured to display a Graphical User Interface (GUI) control. The processor is configured to: determine operation attribute information of a touch operation performed by a user on the GUI control displayed on the display screen; and generate, based on the operation attribute information, a haptic feedback.

18 Claims, 3 Drawing Sheets

(56) References Cited

U.S. PATENT DOCUMENTS

| | | |
|---|---|---|
| 2009/0167509 A1 | 7/2009 | Fadell et al. |
| 2009/0292990 A1 | 11/2009 | Park et al. |
| 2010/0156809 A1 | 6/2010 | Nutaro et al. |
| 2010/0156818 A1 | 6/2010 | Burrough et al. |
| 2012/0131455 A1 | 5/2012 | Han et al. |
| 2014/0139450 A1 | 5/2014 | Levesque et al. |
| 2014/0292668 A1 | 10/2014 | Fricklas et al. |
| 2015/0169059 A1 | 6/2015 | Behles et al. |
| 2015/0293592 A1* | 10/2015 | Cheong .................. G06F 1/163 345/173 |
| 2016/0259542 A1 | 9/2016 | Chaudhri et al. |
| 2017/0357321 A1 | 12/2017 | Fleizach et al. |
| 2018/0113512 A1 | 4/2018 | Kang et al. |
| 2018/0136727 A1 | 5/2018 | Chandy |
| 2019/0028998 A1* | 1/2019 | Fadell ..................... G06F 3/016 |
| 2020/0257364 A1* | 8/2020 | Strandberg ............. B60K 35/81 |
| 2021/0264748 A1 | 8/2021 | Moussette et al. |

FOREIGN PATENT DOCUMENTS

| | | |
|---|---|---|
| CN | 104102376 A | 10/2014 |
| CN | 107430488 A | 12/2017 |
| CN | 108700949 A | 10/2018 |
| CN | 109154859 A | 1/2019 |
| CN | 111552420 A | 8/2020 |
| CN | 111782044 A | 10/2020 |

* cited by examiner

DISPLAY SYSTEMS, OPERATION FEEDBACK METHODS, ELECTRONIC DEVICES AND STORAGE MEDIA

CROSS REFERENCE TO RELATED APPLICATIONS

_This application is a national stage of international PCT Application No. PCT/CN2022/103394 filed on Jul. 1, 2022, and claims a priority to a Chinese Patent Application with the corresponding application number being 202110825871.7 and the application date being Jul. 21, 2021, the entire contents of which are incorporated herein by reference.

TECHNICAL FIELD

The present disclosure relates to the field of display technologies, and in particular to display systems, operation feedback methods, electronic devices and non-volatile computer readable storage media.

BACKGROUND

Graphical User Interface (GUI) controls can be disposed in a display device for touch by a user. For example, at present, GUI controls can be displayed on a display device screen in different application scenarios such as a smart phone, a vehicle-mounted display device, an intelligent television and a central control display device, and a user can achieve a corresponding type operation by performing touch operation on a GUI control.

When the user performs touch operation on GUI controls, some GUI controls can generate feedback. For example, when the user clicks on an application icon on the screen, vibration feedback can be generated instantaneously at least at a click position, so as to express a validity click.

SUMMARY

The present disclosure provides display systems, operation feedback methods, electronic devices and non-volatile computer readable storage media.

According to a first aspect of embodiments of the present disclosure, there is provided a display system, including: a processor, and a display screen configured to display a Graphical User Interface (GUI) control. The processor is configured to: determine operation attribute information of a touch operation performed by a user on the GUI control displayed on the display screen, where the operation attribute information includes a type of the GUI control, an operation position of the touch operation in a region of the GUI control, an operation type of the touch operation, or any combination thereof; and generate, based on the operation attribute information, a haptic feedback.

In an embodiment, the processor is further configured to: determine a haptic feedback strength corresponding to the operation attribute information; and generate a haptic signal corresponding to the haptic feedback strength.

In an embodiment, the feedback strength of the haptic signal is represented by an amplitude of a signal waveform, a type of the signal waveform, a signal frequency, or any combination thereof.

In an embodiment, the type of the signal waveform includes a pulse wave, a square wave, a triangular wave, a rectangular wave, a sawtooth wave, or any combination thereof.

In an embodiment, the type of the GUI control includes a button, a dial, a progress bar, or any combination thereof.

In an embodiment, the type of the GUI control includes a button, and the GUI control includes an edge region and a central region. The feedback strength corresponding to the edge region is greater than the feedback strength corresponding to the central region.

In an embodiment, the type of the GUI control includes a dial, and the GUI control includes line segments extending along multiple directions. The multiple line segments include a first type line segment and a second type line segment, and a feedback strength corresponding to the first type line segment is greater than a feedback strength corresponding to the second type line segment.

In an embodiment, an included angle between adjacent line segments is same, and there is a preset number of second type line segments between two first type line segments.

In an embodiment, a width of the first type line segment is greater than a width of the second type line segment.

In an embodiment, the type of the GUI control includes a progress bar, and the GUI control includes a plurality of lines intersecting with a length direction of the GUI control. The feedback strengths respectively corresponding to the plurality of lines gradually change along the length direction of the GUI control.

In an embodiment, the processor is further configured to, generate auditory feedback, smell feedback, taste feedback, or any combination thereof, based on the operation attribute information.

According to a second aspect of embodiments of the present disclosure, there is provided an operation feedback method, including: determining operation attribute information of a touch operation performed by a user on a GUI control displayed on a display screen, where the operation attribute information includes a type of the GUI control, an operation position of the touch operation in a region of the GUI control, an operation type of the touch operation, or any combination thereof; and generating, based on the operation attribute information, a haptic feedback.

In an embodiment, generating the haptic feedback based on the operation attribute information includes: determining a haptic feedback strength corresponding to the operation attribute information; and generating a haptic signal corresponding to the haptic feedback strength.

In an embodiment, the type of the GUI control includes a button, a dial, a progress bar, or any combination thereof.

In an embodiment, the type of the GUI control includes a button, and the GUI control includes an edge region and a central region. A feedback strength corresponding to the edge region is greater than a feedback strength corresponding to the central region.

In an embodiment, the type of the GUI control includes a dial, and the GUI control includes line segments extending along a plurality of directions. The plurality of line segments include a first type line segment and a second type line segment, and a feedback strength corresponding to the first type line segment is greater than a feedback strength corresponding to the second type line segment.

In an embodiment, an included angle between adjacent line segments is same, and there is a preset number of second type line segments between two first type line segments.

In an embodiment, a width of the first type line segment is greater than a width of the second type line segment.

In an embodiment, the type of the GUI control includes a progress bar, and the GUI control includes a plurality of lines intersecting with a length direction of the GUI control.

The feedback strengths respectively corresponding to the plurality of lines gradually change along the length direction of the GUI control.

According to a third aspect of embodiments of the present disclosure, there is provided an electronic device, including a processor and a memory storing instructions executable by the processor, where the processor is configured to perform the above method.

According to a fourth aspect of embodiments of the present disclosure, there is provided a non-volatile computer readable storage medium, storing a computer program thereon, where the program is executed by a processor to perform steps in the method according to any one of the above items.

In the embodiments of the present disclosure, when a user performs touch operations on GUI controls, the user can feel different haptic feedbacks upon touching different types of GUI controls, touching different positions of the GUI controls and performing different type operations on the GUI controls, which enriches the haptic experiences of the user for the operation on the GUI controls, and can provide effective guide for the touch operation of the user on the GUI controls based on different haptic feedbacks.

It should be understood that, the above general descriptions and the subsequent detailed descriptions are merely used to illustrate the limited examples and interpretations of the core inventive idea of the present disclosure and shall not be used to limit the present disclosure.

DETAILED DESCRIPTION

Figure 1:
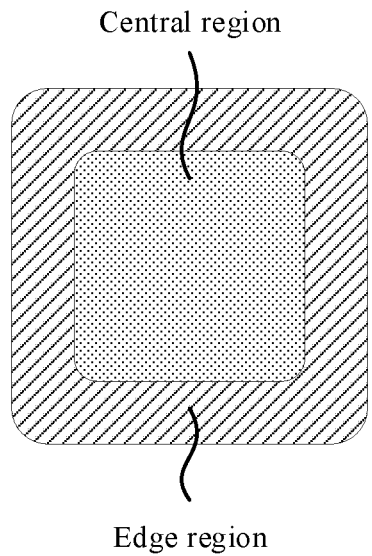
FIG. 1 is a schematic diagram illustrating a GUI control according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following exemplary embodiments do not represent all embodiments consistent with the present disclosure. Rather, they are merely examples of apparatus and method consistent with some aspects of the present disclosure as detailed in the appended claims.

An embodiment of the present disclosure provides a display system. The display system includes a display screen configured to display a GUI control, and a processor. The display system provided by the present embodiment can be applied to a display panel which has a touch function and is capable of receiving a touch operation from a user and generating a haptic feedback for the touch operation. For example, the display panel can display a GUI control and a user can perform touch operations on the GUI control, for example, the touch operations such as click and slide. Thus, the display panel can generate haptic feedbacks for the touch operations performed by the user on the GUI control.

The display panel can be applied to an electronic device with display function. The type of the electronic device is not limited to smart phone, tablet computer, wearable device, vehicle-mounted device and central control device and the like. The application scenario is not limited to intelligent transport, intelligent home, intelligent wearing, intelligent finance and the like.

In an embodiment, the processor is configured to: determine operation attribute information of a touch operation performed by a user on the GUI control displayed on the display screen, where the operation attribute information includes a type of the GUI control, an operation position of the touch operation in a region of the GUI control, an operation type of the touch operation, or any combination thereof; and generate, based on the operation attribute information, a haptic feedback.

In an embodiment, when a touch operation performed by a user on a GUI control is sensed, operation attribute information of the touch operation can be determined, which, for example, includes a type of the operated GUI control, an operation position of the touch operation in the region of the GUI control, and an operation type of the touch operation. The type of the GUI control includes a button, a dial a progress bar, or any combination thereof; the operation type includes a click, a double click, a long-press (can be further divided into light press and heavy press), a slide, a scaling, or any combination thereof.

In an embodiment, for example, the operation attribute information includes the type of the GUI control and the operation position. Different types of GUI controls can correspond to different haptic feedback sets and the haptic feedback sets can include a plurality of haptic feedbacks corresponding to the operation positions. Therefore, after the type of the operated GUI control is determined, the operation position can be further determined and the corresponding haptic feedback is determined from the haptic feedback set based on the operation position.

For example, when the type of the GUI control is a button, the corresponding haptic feedback set includes two elements: one element is a sharp vibration feedback and the corresponding position is located in an edge region of the GUI control; the other element is a heavy vibration feedback and the corresponding position is located in a central region of the GUI control.

When the type of the GUI control on which the user performs touch operation is determined as a button, it is determined that the corresponding haptic feedback set includes the above two elements, and thus, the operation position of the touch operation can be determined. For example, when the operation position is located in the edge region of the GUI control, a sharp vibration feedback can be generated; for another example, when the operation position is located in the central region of the GUI control, a heavy vibration feedback can be generated.

In an embodiment, for example, the operation attribute information includes the operation position and the operation type. Different operation positions can correspond to different haptic feedback sets and one of the haptic feedback sets can include a plurality of haptic feedbacks corresponding to the operation types. Thus, after the operation position of the touch operation is determined, the operation type can be further determined, and the corresponding haptic feedback is determined from the haptic feedback set based on the operation type.

For example, when the operation position is the central region of the GUI control, the corresponding haptic feedback set includes two elements: one element is a low-frequency vibration feedback and the corresponding operation type is light press; the other element is a high-frequency vibration feedback and the corresponding operation type is heavy press.

When it is determined that the operation position of the touch operation of the user is located in the central region of the GUI control, it is determined that the corresponding haptic feedback set includes the above two elements and further the operation type of the touch operation can be determined. For example, when the operation type is light press, a low-frequency vibration feedback can be generated; for another example, when the operation type is heavy press, a high-frequency vibration feedback can be generated.

It is to be noted that a combination of the operation attribute information is not limited to the cases shown in the above two embodiments. The combination of the operation attribute information can be set based on actual requirements, for example, can include the type of the GUI control, the operation position and the operation type.

The technical solution of the present disclosure will be illustrated with the following embodiments in which the operation attribute information includes the operation position.

In an embodiment, a shape feature of the GUI control can be set based on actual requirements, for example, can be set to a rectangle, a circle or a bar. A same type of GUI controls can have different shape features or a same shape feature. Different types of GUI controls can have different shape features or a same shape feature.

With the embodiments in which the button type GUI control has the shape feature of rectangle, the dial type GUI control has the shape feature of circle and the progress bar type GUI control has the shape feature of bar, the technical solution of the present disclosure will be illustrated below. In some embodiments, the correspondence between the type and the shape feature of the GUI control can be adjusted based on requirements.

In an embodiment, the region of the GUI control can be divided and a corresponding haptic feedback is generated based on a region where the operation position is located. The methods for dividing the regions of the GUI controls of different shapes can be different or same. In an embodiment, the shape feature of the GUI control can include a rectangle, a circle, a bar, or any combination thereof.

With a square button type GUI control as an example, the GUI control can be divided into two regions: an edge region and a central region. For example, the edge region includes four sides of the GUI control with a width being ⅖ of a side length. A part other than the edge region in the GUI control is the central region, namely, the edge region is a rectangular box and the central region is a square inside the edge region.

Setting can be performed in such a way that in response to determining that the operation position is in the edge region, a relatively sharp pulse signal is generated as a haptic feedback, and in response to determining that the operation position is in the central region, a steadily heavy square wave signal is generated as a haptic feedback. It is to be noted that the generated signal can cause haptic changes in the display panel, for example, cause the display panel to generate vibration at the operation position. When the user touches the edge region, the user can feel a relatively sharp vibration, and when the user touches the central region, the user can feel a heavy vibration. The ways for the display panel to generate vibration include but not limited to friction electrostatic vibration, vibration apparatus drive and piezoelectric plate vibration and the like.

In some embodiments, it is also possible to directly determine a coordinate of the operation position without dividing the region of the GUI control, and then a corresponding haptic feedback is generated based on the coordinates of the operation position.

In the embodiments of the present disclosure, when a user performs touch operations on GUI controls, the user can feel different haptic feedbacks upon touching different types of GUI controls, touching different positions of the GUI controls and performing different type operations on the GUI controls, which enriches the haptic experiences of the user for the operation on the GUI controls, and can provide effective guide for the touch operation of the user on the GUI controls based on different haptic feedbacks.

For example, the display panel can be applied to a vehicle-mounted device. Since the screen of the vehicle-mounted device is usually larger than that of a terminal such as a smart phone or the like, the displayed GUI controls are also larger in size, which provides convenience for the user to operate. However, during the user's driving process, their gaze needs to remain focused on ahead of the vehicle, and when operating the GUI control, it is inconvenient for the user to see a specific position of a finger in the GUI control, in this case, the user has to speculate on the operation degree for the GUI control from his memory. For example, when adjusting a volume of a player by dragging a slider in the GUI control, the user cannot accurately determine the drag degree of the slider and hence cannot adjust the volume accurately. Therefore, when the user performs touch operation on the GUI control, there may be invalid operation or even mis-operation, affecting the experiences of the user.

In the embodiments of the present disclosure, when the user performs touch operation on the GUI control, different haptic feedbacks can be generated for the user based on different operation positions, which facilitates that, when the user performs touch operation on the GUI control, the user can determine the operation degree for the GUI control based on the haptic feedbacks so as to perform accurate operation.

For example, if the user needs to perform operations on the above square GUI control, the GUI control can perform corresponding operation only when the user long-presses the central region. In the embodiments of the present disclosure, when the user touches the edge region of the GUI control, the user can, based on the sharp vibration, determine that his finger touches the edge region of the GUI control, and then move his finger toward the central region. After his finger touches the central region, the user can, based on the heavy vibration, determine his finger is located in the central region, and hence perform a long-press operation. Thus, the GUI control can be configured in such a way that it can generate a corresponding haptic feedback based on the operation position of the user to effectively guide the user for operation. In this way, the user can accurately complete touch operation based on the haptic feedbacks without seeing the GUI control.

It is to be noted that the above haptic feedback is illustrated with vibration feedback. In addition to the vibration feedback, the haptic feedback can be generated in other ways based on actual requirements, for example, the haptic feedback can be a temperature feedback. Thus, for different operation attribute information, the user can feel different temperature feedbacks.

In an embodiment, the processor is further configured to: determine a haptic feedback strength corresponding to the operation attribute information; and generate a haptic signal corresponding to the haptic feedback strength.

In an embodiment, different feedback strengths can be preset for different operation attribute information. After the operation attribute information of the touch operation of the user is determined, a feedback strength can be quickly determined based on the operation attribute information, and a haptic signal is generated based on the determined feedback strength.

In an embodiment, the feedback strength of the haptic signal can be represented by an amplitude of a signal waveform, a type of the signal waveform, a signal frequency, or any combination thereof.

In an embodiment, the feedback strength of the haptic signal can be adjusted by setting the amplitude, the type of the signal waveform, the signal frequency for the haptic signal, or any combination thereof. For example, the higher the signal frequency is, the larger the feedback strength is, and the lower the signal frequency is, the smaller the feedback strength is; the larger the amplitude is, the larger the feedback strength is, and the smaller the amplitude is, the smaller the feedback strength is.

In an embodiment, the type of the signal waveform includes a pulse wave, a square wave, a triangular wave, a rectangular wave, a sawtooth wave, or any combination thereof. In a case of same amplitude and same frequency, the feedback strengths of the square wave and rectangular wave are smaller and the feedback strengths of the pulse wave, the triangular wave and the sawtooth wave are larger.

For example, when a haptic signal with a large feedback strength is to be designed, the haptic signal can be set to a high-frequency pulse wave; when a haptic signal with a small feedback strength is to be designed, the haptic signal can be set to a low-frequency square wave.

Setting the feedback strength of the haptic signal based on the amplitude and type of the signal waveform and the signal frequency helps to set the feedback strength of the haptic signal more finely.

It is to be noted that, in the practical applications, the signal waveforms corresponding to the haptic feedback are not limited to the above waveforms and can be combination of the several basic waveforms or another waveform converted from the above waveforms, for example, corresponding waveforms are simulated-generated based on required haptic feedbacks.

Several types of GUI controls are illustrated below with several embodiments. The method provided in the embodiments of the present disclosure is not limited to the following several types of GUI controls and the shape features of the GUI controls are also not limited to the cases shown in the following embodiments.

In an embodiment, the type of the GUI control includes a button, a dial, a progress bar, or any combination thereof.

FIG. 1 is a schematic diagram illustrating a GUI control according to an embodiment of the present disclosure.

In an embodiment, as shown in FIG. 1, the GUI control is a button control with the shape feature being rectangle. The GUI control includes an edge region and a central region, and the feedback strength corresponding to the edge region is greater than the feedback strength corresponding to the central region.

The feedback strength of the edge region is different from that of the central region, for example, the feedback strength corresponding to the edge region is larger and the feedback strength corresponding to the central region is smaller. When the operation position is determined to be in the edge region, a relatively sharp pulse signal is generated as the haptic feedback; when the operation position is determined to be in the central region, a steadily heavy square wave signal is generated as the haptic feedback.

When touching the edge region of the GUI control, the user can feel a relatively sharp vibration and may further move his finger toward the central region if necessary, so as to perform a desired touch operation accurately, for example, long-pressing the central region.

It is to be noted that, boundary lines between the regions shown in FIG. 1 are only used to distinguish between the two regions. In actual design of GUI controls, the boundary lines between the displayed regions may not exist inside the GUI control, and the GUI control is displayed as a visually connected-entire region with different haptic feedbacks in different regions, which is conducive to ensuring aesthetic visual effect.

Figure 2:
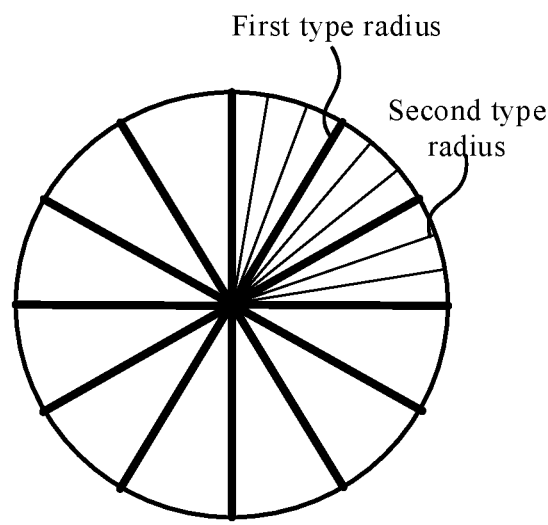
FIG. 2 is a schematic diagram illustrating another GUI control according to an embodiment of the present disclosure.

FIG. 2 is a schematic diagram illustrating another GUI control according to an embodiment of the present disclosure.

In an embodiment, as shown in FIG. 2, the GUI control is a dial control with the shape feature being circle. The GUI control includes a plurality of line segments extending along a plurality of directions, which, for example, are equivalent to radiuses in a circular region. The plurality of line segments include a first type line segment and a second type line segment, and a feedback strength corresponding to the first type line segment is greater than a feedback strength corresponding to the second type line segment.

The circular GUI control shown in FIG. 2 can serve as a dial control. The user can perform touch operation by moving his finger clockwise or counterclockwise in the GUI control. During the touch operation, his finger can pass through a plurality of line segments.

Thus, in the present embodiment, different type line segments are provided and different feedback strengths are set corresponding to different type line segments, such that the user can accurately determine a rotated angle based on the haptic feedbacks during the touch operation.

In an embodiment, in order to determine the operation position of the touch operation, a Cartesian coordinate system can be established in the GUI control shown in FIG. 2, with a center of the circle as the origin, where the horizontally rightward direction is positive x-axis direction and the vertically upward direction is positive y-axis direction. Based on the function arctan 2(y, x), symbols of the x and y coordinates in different quadrants are determined where the angle range is $(-\pi, \pi]$.

For example, as shown in FIG. 2, one line segment can be disposed at every 10° in the range of 360°, where one first type line segment is disposed at every 30° and two second type line segments are disposed between every two first type line segments.

Whether the user performs touch operation clockwise or counterclockwise in the GUI control, his finger always continuously passes through the first type line segments and the second type line segments. In the present embodiment, the feedback strength corresponding to the first type line segments is configured to be greater than the feedback strength corresponding to the second type line segments, such that the finger of the user can feel the haptic feedbacks of different strengths when passing through the first type line segments and the second type line segments.

For example, the first type line segments correspond to a strong vibration and the second type line segments correspond to a weak vibration. When the finger passes through the first type line segments, a relatively strong vibration is generated, and when the finger passes through the second type line segments, a relatively weak vibration is generated. Thus, during operation on the GUI control, the user can directly feel a change in vibration intensity during the operation, helping control the operation amplitude. For example, the user has known that the first type line segments and the second type line segments are distributed as shown in FIG. 2, during an operation, in response to sensing two weak vibrations and one strong vibration, the user can determine that his finger has rotated about 30° in the GUI control and thus can accurately know the operation amplitude without directly viewing the operation process.

In an embodiment, an included angle between adjacent line segments is same, and there is a preset number of second type line segments between two first type line segments.

For example, as shown in FIG. 2, one first type line segment is disposed at every two second type line segments. The GUI control is circular and the line segments are distributed centrosymmetrically. The first type line segments and the second type line segments are disposed based on a specific rule, such that when performing an operation of same amplitude (e.g., passing through a same angle) at any position in the GUI control, the user can feel a same haptic feedback. Thus, the rule for determining the operation amplitude based on the haptic feedback at any position is same and hence the user does not need to distinguish the operation position.

In an embodiment, a width of one of the first type line segments is greater than a width of one of the second type line segments.

Since the line segments are probably distributed densely in the GUI control, the finger of the user usually passes through several line segments in one operation. Further, although the vibration feedbacks at the corresponding positions of the first type line segments and the second type line segments in the GUI control are different, the generated vibrations are still very similar. In this case, when the finger of the user passes through several line segments, it is difficult to accurately distinguish the first type line segments and the second type line segments passed through.

The width of one of the first type line segments is greater than the width of the second type line segments for example, as shown in FIG. 2. In this way, when the finger of the user passes through the first type line segments and the second type line segments at a constant speed, the finger can feel a relatively strong vibration for a longer time when passing through the first type line segments, helping ensure the user can accurately distinguish the first type line segments and the second type line segments based on the haptic feedbacks.

It should be noted that the line segments shown in FIG. 2 are only used to show the relationship between different types of line segments. During the actual design of the GUI control, the GUI control can be displayed without the line segments, and is displayed as a visually connected-entire region with different haptic feedbacks at positions of different type line segments, which is conducive to ensuring aesthetic visual effect. Furthermore, the distribution and the type of the line segments are not limited to the cases shown in FIG. 2 and can be set based on actual requirements. For example, three or more types of line segments can be set and each type of line segments corresponds to a different haptic feedback. For example, one first type line segment can be disposed at every three second type line segments, and for another example, the included angle between two line segments can be different.

Figure 3:
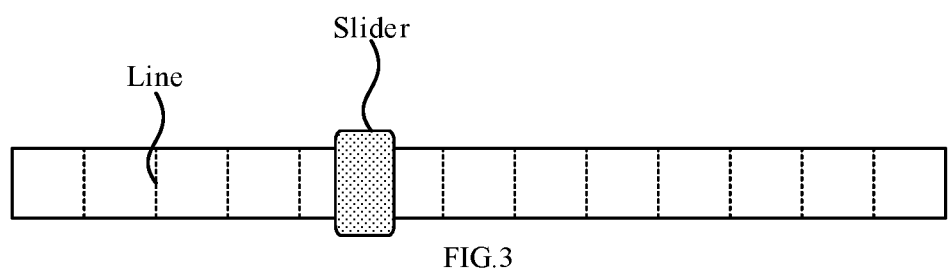
FIG. 3 is a schematic diagram illustrating another GUI control according to an embodiment of the present disclosure.

FIG. 3 is a schematic diagram illustrating another GUI control according to an embodiment of the present disclosure.

In an embodiment, as shown in FIG. 3, the GUI control is a progress bar control with the shape feature being bar. The GUI control includes a plurality of lines intersecting with a length direction of the GUI control, where the feedback strengths respectively corresponding to the plurality of lines gradually change along the length direction of the GUI control.

In an embodiment, the bar-shaped GUI control shown in FIG. 3 can be used for adjustment function, for example, can be used to adjust a volume, a brightness or a temperature or the like. The user can achieve operations by dragging a slider. The feedback strengths respectively corresponding to the plurality of lines are configured to gradually change along the length direction of the GUI control (for example, change level by level), such that the user can feel a gradual change of the haptic feedbacks while dragging the slider, helping the user to accurately determine the operation amplitude based on the feedback strengths of the haptic feedbacks.

For example, the slider in the GUI control sliding from left to right is configured to increase the volume and sliding from right to left is configured to decrease the volume. In this case, the feedback strengths corresponding to the lines can be configured to gradually increase from left to right, and thus, the user can feel a gradually-increasing feedback strength while dragging the slider across the lines from left to right; on the contrary, the user can feel a gradually-decreasing feedback strength while dragging the slider across the lines from right to left. Therefore, the user can accurately determine the dragging amplitude of the slider based on the changes of the feedback strengths, which is conducive to accurately controlling the operation precision.

It is to be noted that the lines shown in FIG. 3 are only used to show the positional relationship of the lines in the GUI control. In actual design of GUI controls, the GUI control can be displayed without the lines, and the GUI control is displayed as a visually connected-entire region with different haptic feedbacks at positions of different lines, which is conducive to ensuring aesthetic visual effect. Furthermore, the width of the GUI control can be far less than the width shown in FIG. 3, for example, in an extreme case, the GUI control visually appears as a line and the slider is a circular point on the line. The number of the lines in the GUI control is not limited to the number shown in FIG. 3 and can be increased or decreased based on actual requirements.

In an embodiment, the processor is further configured to: generate auditory feedback, smell feedback, taste feedback, or any combination thereof, based on the operation attribute information.

In an embodiment, according to the touch operation of the user on the GUI control, on the basis of generating a haptic feedback, other sensory feedbacks such as auditory feedbacks, smell feedbacks and taste feedbacks can be generated.

Taking the example of further generating auditory feedback, for example, when a user operates a dial GUI control, it is detected that a clockwise or counterclockwise touch operation is performed on the dial GUI control, in addition to generating a haptic feedback as in the above embodiments, an auditory feedback can also be generated, such as generating "click, click" sound, and the sound frequency is related to the speed of the user's operation, for example, the faster the user rotates the GUI control counterclockwise, the higher the sound frequency is.

In this way, the user's operation experience is not only enriched from the perspective of haptic, but also from other senses, which is conducive to improving the effectiveness of guiding user operation.

Corresponding to the embodiments of the above display system, the present disclosure further provides an embodiment of an operation feedback method.

Figure 4:
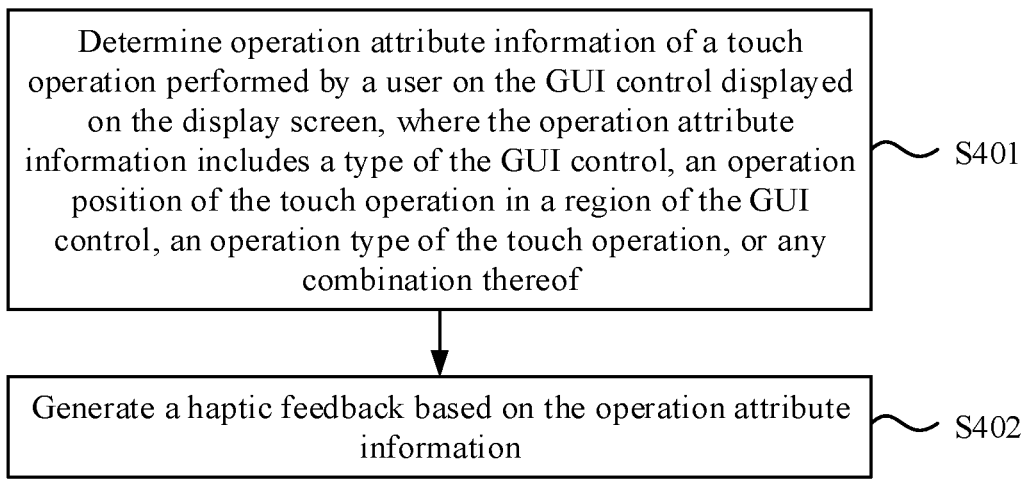
FIG. 4 is a schematic flowchart illustrating an operation feedback method according to an embodiment of the present disclosure.

FIG. 4 is a schematic flowchart illustrating an operation feedback method according to an embodiment of the present disclosure. The operation feedback method in the present embodiment can be applied to a display panel. The display panel has a touch function and is capable of receiving a touch operation from a user and generating a haptic feedback for the touch operation. For example, the display panel can display a GUI control and a user can perform touch operations on the GUI control, for example, the operations such as clicks and slides. Thus, the display panel can generate haptic feedbacks for the touch operations performed by the user on the GUI control.

The display panel can be applied to an electronic device with display function. The type of the electronic device is not limited to smart phone, tablet computer, wearable device, vehicle-mounted device, central control device and the like. The application scenario is not limited to intelligent transport, intelligent home, intelligent wearing, intelligent finance and the like.

As shown in FIG. 4, the operation feedback method can include the following steps.

At step S401, operation attribute information of a touch operation performed by a user on the GUI control displayed on the display screen is determined, where the operation attribute information includes a type of the GUI control, an operation position of the touch operation in a region of the GUI control, an operation type of the touch operation, or any combination thereof.

At step S402, a haptic feedback is generated based on the operation attribute information.

In an embodiment, when a touch operation performed by a user on a GUI control is detected, operation attribute information of the touch operation can be determined, which, for example, includes a type of the operated GUI control, an operation position of the touch operation in the region of the GUI control, and an operation type of the touch operation.

The type of the GUI control includes a button, a dial, a progress bar, or any combination thereof; the operation type includes a click, a double click, a long-press (can be further divided into light press and heavy press), a slide, a scaling, or any combination thereof.

In an embodiment, for example, the operation attribute information includes the type of the GUI control and the operation position. Different types of GUI controls can correspond to different haptic feedback sets, and one of the haptic feedback sets can include a plurality of haptic feedbacks corresponding to the operation positions. Therefore, after the type of the operated GUI control is determined, the operation position can be further determined and the corresponding haptic feedback is determined from the haptic feedback set based on the operation position.

For example, when the type of the GUI control is a button, the corresponding haptic feedback set includes two elements: one element is a sharp vibration feedback and the corresponding position is located in an edge region of the GUI control; the other element is a heavy vibration feedback and the corresponding position is located in a central region of the GUI control.

When the type of the GUI control on which the user performs touch operation is determined as a button, it is determined that the corresponding haptic feedback set includes the above two elements, and thus, the operation position of the touch operation can be determined. For example, when the operation position is located in the edge region of the GUI control, a sharp vibration feedback can be generated; for another example, when the operation position is located in the central region of the GUI control, a heavy vibration feedback can be generated.

In an embodiment, for example, the operation attribute information includes the operation position and the operation type. Different operation positions can correspond to different haptic feedback sets and one of the haptic feedback sets can include a plurality of haptic feedbacks corresponding to the operation types. Thus, after the operation position of the touch operation is determined, the operation type can be further determined, and the corresponding haptic feedback is determined from the haptic feedback set based on the operation type.

For example, when the operation position is the central region of the GUI control, the corresponding haptic feedback set includes two elements: one element is a low-frequency vibration feedback and the corresponding operation type is light press; the other element is a high-frequency vibration feedback and the corresponding operation type is heavy press.

When it is determined that the operation position of the touch operation of the user is located in the central region of the GUI control, it is determined that the corresponding haptic feedback set includes the above two elements and further the operation type of the touch operation can be determined. For example, when the operation type is light press, a low-frequency vibration feedback can be generated; for another example, when the operation type is heavy press, a high-frequency vibration feedback can be generated.

It is to be noted that a combination of the operation attribute information is not limited to the cases shown in the above two embodiments. The combination of the operation attribute information can be set based on actual requirements, for example, can include the type of the GUI control, the operation position and the operation type.

The technical solution of the present disclosure will be illustrated with the following embodiments in which the operation attribute information includes the operation position.

In an embodiment, a shape feature of the GUI control can be set based on actual requirements, for example, can be set to a rectangle, a circle or a bar. A same type of GUI controls can have different shape features or a same shape feature. Different types of GUI controls can have different shape features or a same shape feature.

With the embodiments in which the button type GUI control has the shape feature of rectangle, the dial type GUI control has the shape feature of circle and the progress bar type GUI control has the shape feature of bar, the technical solution of the present disclosure will be illustrated below. In some embodiments, the correspondence between the type and the shape feature of the GUI control can be adjusted based on requirements.

In an embodiment, the region of the GUI control can be divided and a corresponding haptic feedback is generated based on a region where the operation position is located. The methods for dividing the regions of the GUI controls of different shapes can be different or same. In an embodiment, the shape feature of the GUI control can include a rectangle, a circle, a bar, or any combination thereof.

With a square GUI control as an example, the GUI control can be divided into two regions: an edge region and a central region. For example, the edge region includes four sides of the GUI control with a width being ⅖ of a side length. A part other than the edge region in the GUI control is the central region, namely, the edge region is a rectangular box and the central region is a square inside the edge region.

Setting can be performed in such a way that in response to determining that the operation position is in the edge region, a relatively sharp pulse signal is generated as a haptic feedback, and in response to determining that the operation position is in the central region, a steadily heavy square wave signal is generated as a haptic feedback. It is to be noted that the generated signal can cause haptic changes in the display panel, for example, cause the display panel to generate vibration at the operation position. When the user touches the edge region, the user can feel a relatively sharp vibration, and when the user touches the central region, the user can feel a heavy vibration. The ways for the display panel to generate vibration include but not limited to friction electrostatic vibration, vibration apparatus drive and piezoelectric plate vibration and the like.

In some embodiments, it is also possible to directly determine a coordinate of the operation position without dividing the region of the GUI control, and then a corresponding haptic feedback is generated based on the coordinates of the operation position.

In the embodiments of the present disclosure, when a user performs touch operations on GUI controls, the user can feel different haptic feedbacks upon touching different types of GUI controls, touching different positions of the GUI controls and performing different type operations on the GUI controls, which enriches the haptic experiences of the user for the operation on the GUI controls, and can provide effective guide for the touch operation of the user on the GUI controls based on different haptic feedbacks.

For example, the display panel can be applied to a vehicle-mounted device. Since the screen of the vehicle-mounted device is usually larger than that of a terminal such as a smart phone or the like, the displayed GUI controls are also larger in size, which provides convenience for the user to operate. However, during the user's driving process, their gaze needs to remain focused on ahead of the vehicle, and when operating the GUI control, it is inconvenient for the user to see a specific position of a finger in the GUI control, in this case, the user has to speculate on the operation degree for the GUI control from his memory. For example, when adjusting a volume of a player by dragging a slider in the GUI control, the user cannot accurately determine the drag degree of the slider and hence cannot adjust the volume accurately. Therefore, when the user performs touch operation on the GUI control, there may be invalid operation or even mis-operation, affecting the experiences of the user.

In the embodiments of the present disclosure, when the user performs touch operation on the GUI control, different haptic feedbacks can be generated for the user based on different operation positions, which facilitates that, when the user performs touch operation on the GUI control, the user can determine the operation degree for the GUI control based on the haptic feedbacks so as to perform accurate operation.

For example, if the user needs to perform operations on the above square GUI control, the GUI control can perform corresponding operation only when the user long-presses the central region. In the embodiments of the present disclosure, when the user touches the edge region of the GUI control, the user can, based on the sharp vibration, determine that his finger touches the edge region of the GUI control, and then move his finger toward the central region. After his finger touches the central region, the user can, based on the heavy vibration, determine his finger is located in the central region, and hence perform a long-press operation.

Thus, the GUI control can be configured in such a way that it can generate a corresponding haptic feedback based on the operation position of the user to effectively guide the user for operation. In this way, the user can accurately complete touch operation based on the haptic feedbacks without seeing the GUI control.

It is to be noted that the above haptic feedback is illustrated with vibration feedback. In addition to the vibration feedback, the haptic feedback can be generated in other ways based on actual requirements, for example, the haptic feedback can be a temperature feedback. Thus, for different operation attribute information, the user can feel different temperature feedbacks.

Figure 5:
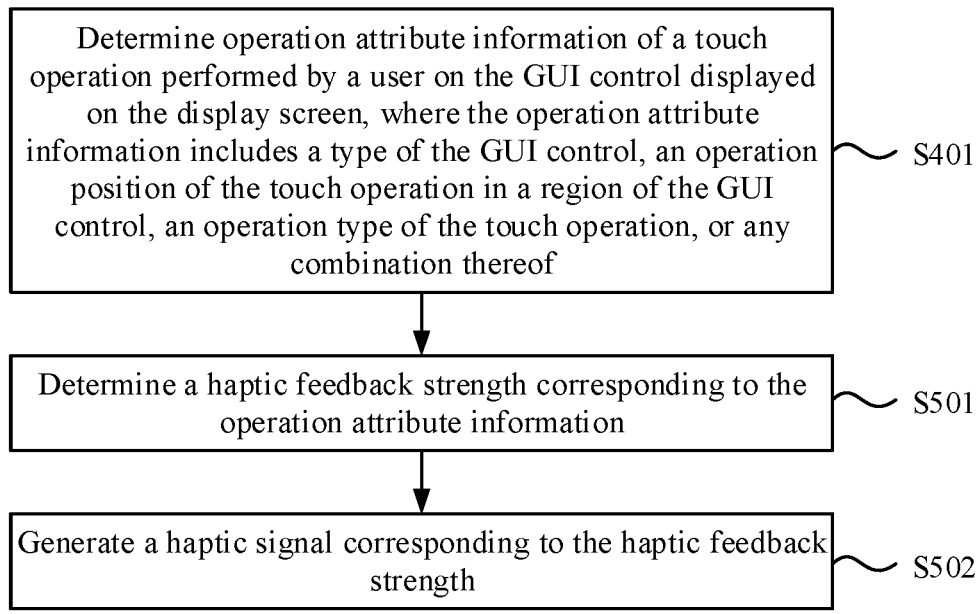
FIG. 5 is a schematic flowchart illustrating another operation feedback method according to an embodiment of the present disclosure.

FIG. 5 is a schematic flowchart illustrating another operation feedback method according to an embodiment of the present disclosure. As shown in FIG. 5, generating the haptic feedback based on the operation attribute information includes the following steps.

At step S501, a haptic feedback strength corresponding to the operation attribute information is determined.

At step S502, a haptic signal corresponding to the haptic feedback strength is generated.

In an embodiment, different feedback strengths can be preset for different operation attribute information. After the operation attribute information of the touch operation of the user is determined, a feedback strength can be quickly determined based on the operation attribute information, and a haptic signal is generated based on the determined feedback strength.

In an embodiment, the feedback strength of the haptic signal can be represented by an amplitude of a signal waveform, a type of the signal waveform, a signal frequency, or any combination thereof.

In an embodiment, the feedback strength of the haptic signal can be adjusted by setting the amplitude, the type of the signal waveform, the signal frequency for the haptic signal, or any combination thereof. For example, the higher the signal frequency is, the larger the feedback strength is, and the lower the signal frequency is, the smaller the feedback strength is; the larger the amplitude is, the larger the feedback strength is, and the smaller the amplitude is, the smaller the feedback strength is.

In an embodiment, the type of the signal waveform includes a pulse wave, a square wave, a triangular wave, a rectangular wave, a sawtooth wave, or any combination thereof. In a case of same amplitude and same frequency, the feedback strengths of the square wave and rectangular wave are smaller and the feedback strengths of the pulse wave, the triangular wave and the sawtooth wave are larger.

For example, when a haptic signal with a large feedback strength is to be designed, the haptic signal can be set to a high-frequency pulse wave; when a haptic signal with a small feedback strength is to be designed, the haptic signal can be set to a low-frequency square wave.

Setting the feedback strength of the haptic signal based on the amplitude and type of the signal waveform and the signal frequency helps to set the feedback strength of the haptic signal more finely.

It is to be noted that, in the practical applications, the signal waveforms corresponding to the haptic feedback are not limited to the above waveforms and can be combination of the several basic waveforms or another waveform converted from the above waveforms, for example, corresponding waveforms are simulated-generated based on required haptic feedbacks.

Several types of GUI controls are illustrated below with several embodiments. The method provided in the embodiments of the present disclosure is not limited to the following several types of GUI controls and the shape features of the GUI controls are also not limited to the cases shown in the following embodiments.

In an embodiment, the type of the GUI control includes a button, a dial, a progress bar, or any combination thereof.

FIG. 1 is a schematic diagram illustrating a GUI control according to an embodiment of the present disclosure.

In an embodiment, as shown in FIG. 1, the GUI control is a button control with the shape feature being rectangle. The GUI control includes an edge region and a central region, and the feedback strength corresponding to the edge region is greater than the feedback strength corresponding to the central region.

The feedback strength of the edge region is different from that of the central region, for example, the feedback strength corresponding to the edge region is larger and the feedback strength corresponding to the central region is smaller. When the operation position is determined to be in the edge region, a relatively sharp pulse signal is generated as the haptic feedback; when the operation position is determined to be in the central region, a steadily heavy square wave signal is generated as the haptic feedback.

When touching the edge region of the GUI control, the user can feel a relatively sharp vibration and may further move his finger toward the central region if necessary, so as to perform a desired touch operation accurately, for example, long-pressing the central region.

It is to be noted that, the boundary lines between the regions shown in FIG. 1 are only used to distinguish the two regions. In actual design of GUI controls, the boundary lines between the displayed regions may not exist inside the GUI control, and the GUI control is displayed as a visually connected-entire region with different haptic feedbacks in different regions, which is conducive to ensuring aesthetic visual effect.

FIG. 2 is a schematic diagram illustrating another GUI control according to an embodiment of the present disclosure.

In an embodiment, as shown in FIG. 2, the GUI control is a dial control with the shape feature being circle. The GUI control includes a plurality of line segments extending along a plurality of directions, which, for example, are equivalent to radiuses in a circular region. The plurality of line segments include a first type line segment and a second type line segment, and a feedback strength corresponding to the first type line segment is greater than a feedback strength corresponding to the second type line segment.

The circular GUI control shown in FIG. 2 can serve as a dial control. The user can perform touch operation by moving his finger clockwise or counterclockwise in the GUI control. During the touch operation, his finger can pass through a plurality of line segments. Thus, in the present embodiment, different type line segments are provided and different feedback strengths are set corresponding to different type line segments, such that the user can accurately determine a rotated angle based on the haptic feedbacks during the touch operation.

In an embodiment, in order to determine the operation position of the touch operation, a Cartesian coordinate system can be established in the GUI control shown in FIG. 2, with a center of the circle as the origin, where the horizontally rightward direction is positive x-axis direction and the vertically upward direction is positive y-axis direction. Based on the function arctan 2(y, x), symbols of the x and y coordinates in different quadrants are determined where the angle range is $(-\pi, \pi]$.

For example, as shown in FIG. 2, one line segment can be disposed at every 10° in the range of 360°, where one first type line segment is disposed at every 30° and two second type line segments are disposed between every two first type line segments.

Whether the user performs touch operation clockwise or counterclockwise in the GUI control, his finger always continuously passes through the first type line segments and the second type line segments. In the present embodiment, the feedback strength corresponding to the first type line segments is configured to be greater than the feedback strength corresponding to the second type line segments, such that the finger of the user can feel the haptic feedbacks of different strengths when passing through the first type line segments and the second type line segments.

For example, the first type line segments correspond to a strong vibration and the second type line segments correspond to a weak vibration. When the finger passes through the first type line segments, a relatively strong vibration is generated, and when the finger passes through the second type line segments, a relatively weak vibration is generated. Thus, during operation on the GUI control, the user can directly feel a change in vibration intensity during the operation, helping control the operation amplitude. For example, the user has known that the first type line segments and the second type line segments are distributed as shown in FIG. 2, during an operation, in response to sensing that two weak vibrations and one strong vibration, the user can determine that his finger has rotated about 30° in the GUI control and thus can accurately know the operation amplitude without directly viewing the operation process.

In an embodiment, an included angle between adjacent line segments is same, and there is a preset number of second type line segments between two first type line segments.

For example, as shown in FIG. 2, there is a preset number of second type line segments between two first type line segments. The GUI control is circular and the line segments are distributed centrosymmetrically. The first type line segments and the second type line segments are disposed based on a specific rule, such that when performing an operation of same amplitude (e.g., passing through a same angle) at any position in the GUI control, the user can feel a same haptic feedback. Thus, the rule for determining the operation amplitude based on the haptic feedback at any position is same and hence the user does not need to distinguish the operation position.

In an embodiment, a width of one of the first type line segments is greater than a width of one of the second type line segments.

Since the line segments are probably distributed densely in the GUI control, the finger of the user usually passes through several line segments in one operation. Further, although the vibration feedbacks at the corresponding positions of the first type line segments and the second type line segments in the GUI control are different, the generated vibrations are still very similar. In this case, when the finger of the user passes through several line segments, it is difficult to accurately distinguish the first type line segments and the second type line segments passed through.

The width of one of the first type line segments is greater than the width of the second type line segments for example, as shown in FIG. 2. In this way, when the finger of the user passes through the first type line segments and the second type line segments at a constant speed, the finger can feel a relatively strong vibration for a longer time when passing through the first type line segments, helping ensure the user can accurately distinguish the first type line segments and the second type line segments based on the haptic feedbacks.

It should be noted that the line segments shown in FIG. 2 are only used to show the relationship between different types of line segments. During the actual design of the GUI control, the GUI control can be displayed without the line segments, and is displayed as a visually connected-entire region with different haptic feedbacks at positions of different type line segments, which is conducive to ensuring aesthetic visual effect. Furthermore, the distribution and the type of the line segments are not limited to the cases shown in FIG. 2 and can be set based on actual requirements. For example, three or more types of line segments can be set and each type of line segments corresponds to a different haptic feedback. For example, one first type line segment can be disposed at every three second type line segments, and for another example, the included angle between two line segments can be different.

FIG. 3 is a schematic diagram illustrating another GUI control according to an embodiment of the present disclosure.

In an embodiment, as shown in FIG. 3, the GUI control is a progress bar control with the shape feature being bar. The GUI control includes a plurality of lines intersecting with a length direction of the GUI control, where the feedback strengths respectively corresponding to the plurality of lines gradually change along the length direction of the GUI control.

In an embodiment, the bar-shaped GUI control shown in FIG. 3 can be used for adjustment function, for example, can be used to adjust a volume, a brightness or a temperature or the like. The user can achieve operations by dragging a slider. The feedback strengths respectively corresponding to the plurality of lines are configured to gradually change along the length direction of the GUI control (for example, change level by level), such that the user can feel a gradual change of the haptic feedbacks while dragging the slider, helping the user to accurately determine the operation amplitude based on the feedback strengths of the haptic feedbacks.

For example, the slider in the GUI control sliding from left to right is configured to increase the volume and sliding from right to left is configured to decrease the volume. In this case, the feedback strengths corresponding to the lines can be configured to gradually increase from left to right, and thus, the user can feel a gradually-increasing feedback strength while dragging the slider across the lines from left to right; on the contrary, the user can feel a gradually-decreasing feedback strength while dragging the slider across the lines from right to left. Therefore, the user can accurately determine the dragging amplitude of the slider based on the changes of the feedback strengths, which is conducive to accurately controlling the operation precision.

It is to be noted that the lines shown in FIG. 3 are only used to show the positional relationship of the lines in the GUI control. In actual design of GUI controls, the GUI control can be displayed without the lines, and the GUI control is displayed as a visually connected-entire region with different haptic feedbacks at positions of different lines, which is conducive to ensuring aesthetic visual effect. Furthermore, the width of the GUI control can be far less than the width shown in FIG. 3, for example, in an extreme case, the GUI control visually appears as a line and the slider is a circular point on the line. The number of the lines in the GUI control is not limited to the number shown in FIG. 3 and can be increased or decreased based on actual requirements.

An embodiment of the present disclosure further provides an electronic device, including a processor and a memory storing instructions executable by the processor, where the processor is configured to perform the operation feedback method according to any one of the above embodiments.

An embodiment of the present disclosure further provides a non-volatile computer readable storage medium, storing a computer program thereon, where the program is executed by a processor to perform the steps in the operation feedback method according to any one of the above embodiments.

Figure 6:
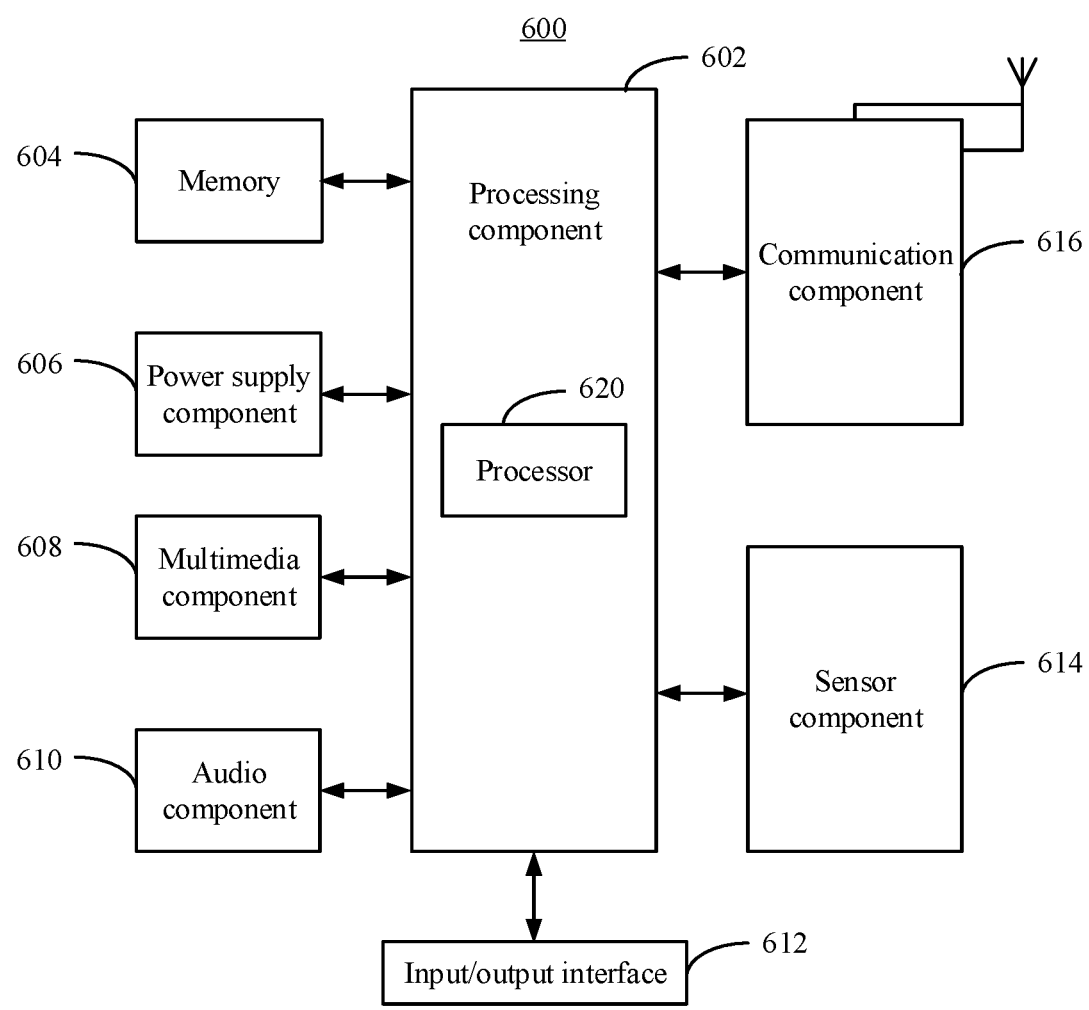
FIG. 6 is a block diagram illustrating an apparatus for haptic feedback according to an embodiment of the present disclosure.

FIG. 6 is a block diagram of an apparatus 600 for operation feedback according to an embodiment of the present disclosure. For example, the apparatus 600 can be a mobile phone, a computer, a digital broadcast terminal, a message transceiver, a game console, a tablet device, a medical device, a fitness device, a personal digital assistant, and the like.

As shown in FIG. 6, the apparatus 600 can include one or more of the following components: a processing component 602, a memory 604, a power supply component 606, a multimedia component 608, an audio component 610, an input/output (I/O) interface 612, a sensor component 614 and a communication component 616.

The processing component 602 generally controls overall operations of the apparatus 600, such as operations associated with display, phone calls, data communications, camera operations, and recording operations. The processing component 602 can include one or more processors 620 to execute instructions to complete all or part of the steps of the above method. In addition, the processing component 602 can include one or more modules which facilitate the interaction between the processing component 602 and other components. For example, the processing component 602 can include a multimedia module to facilitate the interaction between the multimedia component 608 and the processing component 602.

The memory 604 is configured to store various types of data to support the operation on the apparatus 600. Examples of such data include instructions for any application program or method operated on the apparatus 600, contact data, phonebook data, messages, pictures, videos, and so on. The memory 604 can be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 606 supplies power for different components of the apparatus 600. The power supply component 606 may include a power supply management system, one or more power supplies, and other components associated with generating, managing and distributing power for the apparatus 600.

The multimedia component 608 includes a screen providing an output interface between the apparatus 600 and a user. In some examples, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 608 includes a front camera and/or a rear camera. When the apparatus 600 is in an operation mode, such as a shooting mode or a video mode, the front camera and/or the rear camera may receive external multimedia data. Each of the front and rear cameras may be a fixed optical lens system or have a focal length and an optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, and a voice recognition mode. The received audio signal can be further stored in the memory 604 or transmitted via the communication component 616. In some embodiments, the audio component 610 also includes a loudspeaker for outputting an audio signal.

The I/O interface 612 provides an interface between the processing component 602 and a peripheral interface module which can be a keyboard, a click wheel, a button, or the like. These buttons can include, but are not limited to a home button, a volume button, a start button, and a lock button.

The sensor component 614 includes one or more sensors for providing a status assessment in various aspects to the apparatus 600. For example, the sensor component 614 can detect an open/closed state of the apparatus 600, and the relative positioning of components, for example, the component is a display and a keypad of the apparatus 600. The sensor component 614 may also detect a change in position of the apparatus 600 or a component of the apparatus 600, the presence or absence of a user in contact with the apparatus 600, the orientation or acceleration/deceleration of the apparatus 600 and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an acceleration sensor, a gyro sensor, a magnetic sensor, a pressure sensor, or a temperature sensor.

The communication component 616 is configured to facilitate wired or wireless communication between the apparatus 600 and other devices. The apparatus 600 may access a wireless network based on a communication standard, such as WiFi, 2G, 3G, 4G LTE, 5G NR or a combination thereof. In an exemplary embodiment, the communication component 616 receives broadcast signals or broadcast associated information from an external broadcast management system via a broadcast channel. In an exemplary embodiment, the communication component 616 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an exemplary embodiment, the apparatus 600 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the above method.

In an exemplary embodiment, there is also provided a non-volatile computer readable storage medium, such as a memory 604 including instructions, where the instructions are executed by the processor 620 of the apparatus 600 to perform the method as described above. For example, the non-volatile computer readable storage medium may be a Read Only Memory (ROM), a Random Access Memory (RAM), a CD-ROM, a magnetic tape, a floppy disk, and an optical data storage device and the like.

In the present disclosure, the terms such as "first" and "second" are used only for the purpose of descriptions and shall not be understood as indicating or implying relative importance. The term "a plurality of" refers to two or more unless otherwise stated.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A display system, comprising a processor, and a display screen configured to display a Graphical User Interface (GUI) control; wherein,
   the processor is configured to:
   determine operation attribute information of a touch operation performed by a user on the GUI control displayed on the display screen, wherein the operation attribute information comprises a type of the GUI control, an operation position of the touch operation in a region of the GUI control, an operation type of the touch operation, or any combination thereof; and
   generate, based on the operation attribute information, a haptic feedback;
   wherein the GUI control is a dial, the dial comprises line segments extending along a plurality of directions, the plurality of line segments comprise a first type line segment and a second type line segment, and a haptic feedback strength corresponding to the first type line segment is greater than a haptic feedback strength corresponding to the second type line segment.

2. The display system of claim 1, wherein the processor is further configured to:
   determine a haptic feedback strength corresponding to the operation attribute information; and
   generate a haptic signal corresponding to the haptic feedback strength.

3. The display system of claim 2, wherein the haptic feedback strength is represented by an amplitude of a signal waveform, a type of the signal waveform, a signal frequency, or any combination thereof.

4. The display system of claim 3, wherein the type of the signal waveform comprises a pulse wave, a square wave, a triangular wave, a rectangular wave, a sawtooth wave, or any combination thereof.

5. The display system of claim 2, wherein the type of the GUI control further comprises a button, a progress bar, or any combination thereof.

6. The display system of claim 5, wherein the GUI control is the button, the button comprises an edge region and a central region, and a haptic feedback strength corresponding to the edge region is greater than a haptic feedback strength corresponding to the central region.

7. The display system of claim 1, wherein an included angle between adjacent line segments is same, and there is a preset number of second type line segments between two first type line segments.

8. The display system of claim 5, wherein a width of the first type line segment is greater than a width of the second type line segment.

9. The display system of claim 5, wherein the GUI control is the progress bar, the progress bar comprises a plurality of lines intersecting with a length direction of the progress bar, and haptic feedback strengths respectively corresponding to the plurality of lines gradually change along the length direction of the progress bar.

10. The display system of claim 1, wherein the processor is further configured to, generate auditory feedback, smell feedback, taste feedback, or any combination thereof, based on the operation attribute information.

11. An operation feedback method, comprising:
determining operation attribute information of a touch operation performed by a user on a Graphical User Interface (GUI) control displayed on a display screen, wherein the operation attribute information comprises a type of the GUI control, an operation position of the touch operation in a region of the GUI control, an operation type of the touch operation, or any combination thereof; and
generating, based on the operation attribute information, a haptic feedback;
wherein the GUI control is a dial, the dial comprises line segments extending along a plurality of directions, the plurality of line segments comprise a first type line segment and a second type line segment, and a haptic feedback strength corresponding to the first type line segment is greater than a haptic feedback strength corresponding to the second type line segment.

12. The operation feedback method of claim 11, wherein generating the haptic feedback based on the operation attribute information comprises:
determining a haptic feedback strength corresponding to the operation attribute information; and
generating a haptic signal corresponding to the haptic feedback strength.

13. The operation feedback method of claim 12, wherein the type of the GUI control further comprises a button, a progress bar, or any combination thereof.

14. The operation feedback method of claim 13, wherein the GUI control is the button, the button comprises an edge region and a central region, and a haptic feedback strength corresponding to the edge region is greater than a haptic feedback strength corresponding to the central region.

15. The operation feedback method of claim 11, wherein an included angle between adjacent line segments is same, and there is a preset number of second type line segments between two first type line segments.

16. The operation feedback method of claim 11, wherein a width of the first type line segment is greater than a width of the second type line segment.

17. The operation feedback method of claim 13, wherein the GUI control is the progress bar, the progress bar comprises a plurality of lines intersecting with a length direction of the progress bar, and haptic feedback strengths respectively corresponding to the plurality of lines gradually change along the length direction of the progress bar.

18. An electronic device, comprising a processor and a memory storing instructions executable by the processor, wherein the processor is configured to:
determine operation attribute information of a touch operation performed by a user on the Graphical User Interface (GUI) control displayed on the display screen, wherein the operation attribute information comprises a type of the GUI control, an operation position of the touch operation in a region of the GUI control, an operation type of the touch operation, or any combination thereof; and
generate, based on the operation attribute information, a haptic feedback;
wherein the GUI control is a dial, the dial comprises line segments extending along a plurality of directions, the plurality of line segments comprise a first type line segment and a second type line segment, and a haptic feedback strength corresponding to the first type line segment is greater than a haptic feedback strength corresponding to the second type line segment.

* * * * *